United States Patent [19]

Kee et al.

[11] Patent Number: 4,516,844

[45] Date of Patent: May 14, 1985

[54] FILM CASSETTE USABLE AS PROCESSING CHAMBER

[75] Inventors: Richard C. Kee, Chestnut Hill; Philip R. Norris, No. Reading, both of Mass.

[73] Assignee: Polaroid Corporation, Cambridge, Mass.

[21] Appl. No.: 606,203

[22] Filed: May 2, 1984

[51] Int. Cl.$^3$ ...................... G03B 17/26; G03B 17/50; G03D 13/02

[52] U.S. Cl. .................................... 354/275; 354/313; 354/338

[58] Field of Search ........................ 354/83, 89, 90, 91, 354/92, 275, 312, 313, 316, 332, 336, 337, 338; 352/78 R, 130

[56] References Cited

U.S. PATENT DOCUMENTS

| | | | |
|---|---|---|---|
| 1,501,904 | 7/1924 | Harris | 354/331 |
| 3,260,186 | 7/1966 | Lowell | 354/313 |
| 3,383,998 | 5/1968 | Takats | 352/130 |
| 3,595,158 | 7/1971 | Long | 354/331 |
| 3,667,361 | 6/1972 | Meggs | 354/318 |
| 4,142,193 | 2/1979 | Otte et al. | 352/130 |
| 4,145,133 | 3/1979 | Wareham | 354/275 |
| 4,212,521 | 7/1980 | Stella | 352/130 |
| 4,265,525 | 5/1981 | Stella et al. | 354/76 |
| 4,283,134 | 8/1981 | Columbus | 354/275 |
| 4,291,966 | 9/1981 | Bendoni et al. | 354/275 |
| 4,374,195 | 2/1983 | Hutchinson | 430/499 |

OTHER PUBLICATIONS

"The Man Who Fell to Earth" by Walter Tevis, published by Fawcett Publications Inc. in 1963, pp. 27 through 29.

Research Disclosure, Apr. 1980, pp. 132–134, Disclosure No. 19219.

*Primary Examiner*—A. A. Mathews

*Attorney, Agent, or Firm*—Alfred E. Corrigan

[57] ABSTRACT

A photographic film assemblage including a film cassette having a film spool rotatably supported therein, and a length of self-developing type film coiled about the spool with one of its ends secured to the spool and its other end extending to the exterior of the film cassette for subsequent attachment to a film take-up member of a camera. The spool includes a cylinder and a piston mounted for reciprocating movement within the cylinder. Also located within the cylinder is a supply of processing fluid. After the film has been exposed and rewound into the cassette, the piston is moved deeper into the cylinder to cause the processing fluid to move from the cylinder into an annular chamber which surrounds the cylinder and which contains the film, where it initiates the formation of visible images within the film.

5 Claims, 3 Drawing Figures

FIG. 1
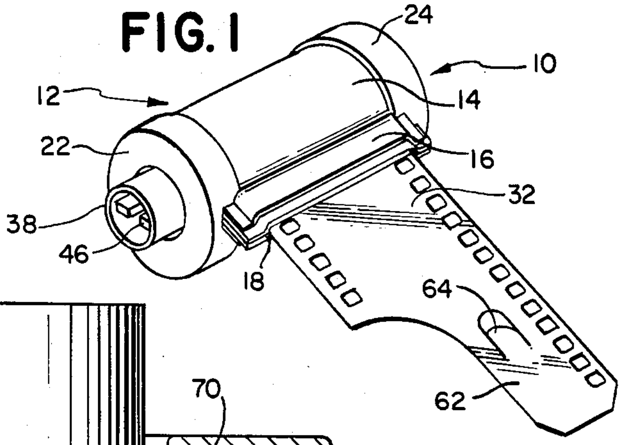
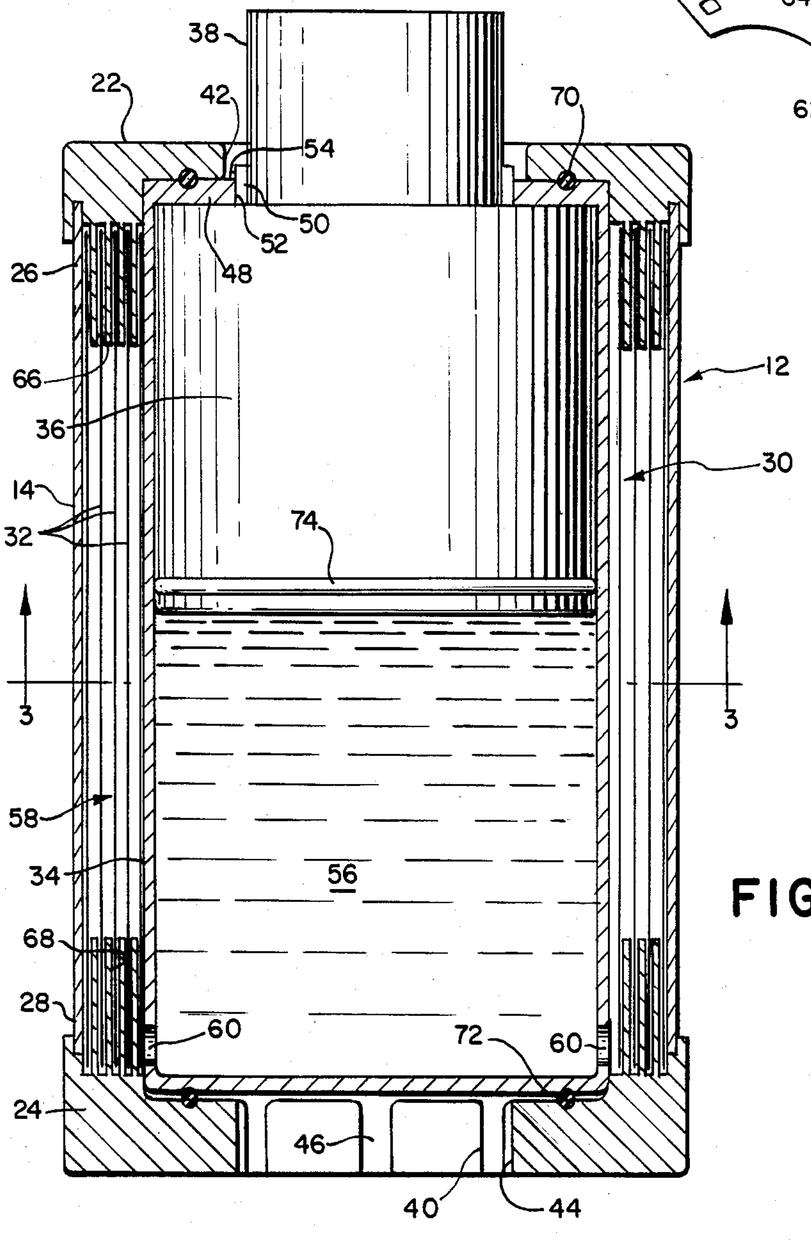
FIG. 2

FILM CASSETTE USABLE AS PROCESSING CHAMBER

RELATED APPLICATION

This application is related to application Ser. No. 606,204, filed on instant date herewith, by Philip R. Norris and entitled "Film Assembly Including a Cannister For Housing A Film Cassette During Processing of Film".

BACKGROUND OF THE INVENTION

1. Field of the Invention

This invention relates to a photographic film assemblage containing film of the self-developing or instant type.

2. Description of the Prior Art

This invention relates to a photographic film assemblage, preferably of the 35 mm format, containing a roll of film, preferably of the instant or self-developing transparency type film, and more particularly, to such a film assemblage which is constructed in a manner that facilitates the processing of the film. It is known that a film assemblage including a film cassette containing a length of film may be placed in a camera, the film withdrawn from the film cassette and photographically exposed, and the exposed film rewound and processed in a film processor specially adapted for use with the film assemblage. Examples of such systems can be found in U.S. Pat. Nos. 4,291,966, 4,212,521, 4,145,133 and 3,260,186. While these systems have their own special advantages, the separate processor adds to the cost of the system, requires the proper positioning of the film cassette within the processor, and/or the threading of the film leader to a film take-up spool.

The requirement of a separate film processor has been obviated by using the film cassette as the chamber in which the film is processed. Examples of such systems are shown in U.S. Pat. Nos. 4,374,195, 4,283,134, 4,265,525, 3,667,361 and in disclosure No. 19219 on pages 132-134 of the April 1980 edition of Research Disclosure. However, each of these systems has at least one feature which detracts from its use in the processing of a single roll of film. For example, the systems disclosed in the '134 and '525 patents are not readily adapted for use with the processing of roll of film, vis-a-vis the processing of individual planar type film units. While the system disclosed in the '361 patent relates to the processing of roll film, the cassette's volume is relatively large because of the separate chamber containing the processing fluid, thus detracting from its use in compact cameras. Finally, the systems disclosed in the '195 patent and in the Research Disclosure article teach the placement of processing fluid container(s) in a chamber defined by what appears to be a conventional film spool and the interior surfaces of a film cassette. Such placement requires an unnecessarily large volume chamber for a given length of film or conversely the length of film stored in the chamber must be decreased in order to accommodate the volume of the processing fluid container(s). Further, most of these systems teach the rupturing of the processing fluid container(s) while it is located exteriorly of the film cassette and while the film cassette is in a camera, thus, possibly subjecting camera parts to the corrosive effects of any processing fluid which may be expressed from between layers of the film.

From the foregoing it can be seen that there is a need for a simple and inexpensive means for facilitating the processing of a roll of photographically exposed film.

SUMMARY OF THE INVENTION

The instant invention relates to a photographic film assemblage including a film cassettte containing therein a roll of film, preferably transparency film of the instant or self-developing type, and more particularly, to such a film assemblage wherein the film cassette is also adapted to function as a chamber in which the film is to be processed subsequent to its exposure. The film cassette includes a shell having a generally cylindrical configuration with a lighttight film withdrawal slot formed by the opposite edges of the shell, and an end cap secured to each of the opposite ends of the shell. A film spool is centrally located within the film cassette and is supported for rotation therein by first and second journals which extend from opposite ends of the film spool and through an opening in each of the end caps. The roll of film includes a leader which is adapted to extend to the exterior of the film cassette via the film withdrawal slot, a trailing end which is secured to the film spool, and an intermediate length containing several frames coiled about the film spool.

The film spool consists of two members, i.e., a tube or cylinder having a closed end and a correspondingly configured piston, of which the first journal is a portion thereof. The piston is partially located within the tube and is connected to the tube by a spline and groove connection, whereby rotary movement of the first journal by a film winding or unwinding member of a camera is transferred to the tube thereby causing the film to be wound upon or unwound from the film spool. A frangible connection also exists between the two members which prevents the piston from being moved further into the tube or cylinder until a predetermined pressure has been exerted upon the first journal.

Also located within the tube or cylinder is a quantity of processing fluid that is sufficient to process any photographically exposed film which is wound upon the film spool. The walls of the cylinder are provided with at least one rupturable port via which the processing fluid may flow from the interior of the cylinder to a chamber containing the exposed film.

The film assemblage of the instant invention is adapted to be placed within currently available cameras where the film's leader is attached to a film take-up member. The film is progressively withdrawn from the film cassette until all of the frames have been exposed. The film is then rewound upon the film spool and the film cassette removed from the camera. The user may now apply pressure upon the first journal until the frangible connection breaks thereby permitting the force on the piston to increase the pressure of the processing fluid to a point where it ruptures the rupturable port(s). Thus ruptured, the processing fluid flows into the chamber within the film cassette and into engagement with the exposed film as the piston is moved deeper into the cylinder. Contact between the processing fluid and the film may be enhanced by spacing adjacent convolutions of the film from each other, such as by locating longitudinal edges of the film in a spiral groove formed in each of the end caps. After a period of time sufficient to initiate the formation of visible images within the film, the film may be removed from the film cassette for subsequent mounting and/or viewing and the film casette safely discarded. To facilitate the removal of the film from the film cassette, the film's leader may be provided with any suitable means to prevent its movement fully into the film cassette during rewinding of the film. Also, while it is preferred that the actuation of the piston in order to increase the pressure upon the processing fluid be accomplished manually, such action could also be the result of the actuation of a camera member especially adapted for this use.

An object of the invention is to provide a photographic film assemblage with a film cassette which in addition to providing a roll of film with a lighttight environment, also functions as a film processing chamber.

Another object of the invention is to provide a photographic film assemblage of the type described with a film cassette having a film spool from which a processing fluid may be expressed into a chamber containing exposed film.

Still another object of the invention is to provide a photographic film assemblage of the type described with means for spacing adjacent convolutions of film during the rewinding of the latter into a film cassette for processing.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

FIG. 1 is a perspective view of a photographic film assemblage which incorporates the present invention;

FIG. 2 is an enlarged side view, partly in section, of the film assemblage shown in FIG. 1.

DETAILED DESCRIPTION OF THE INVENTION

Figure 3:
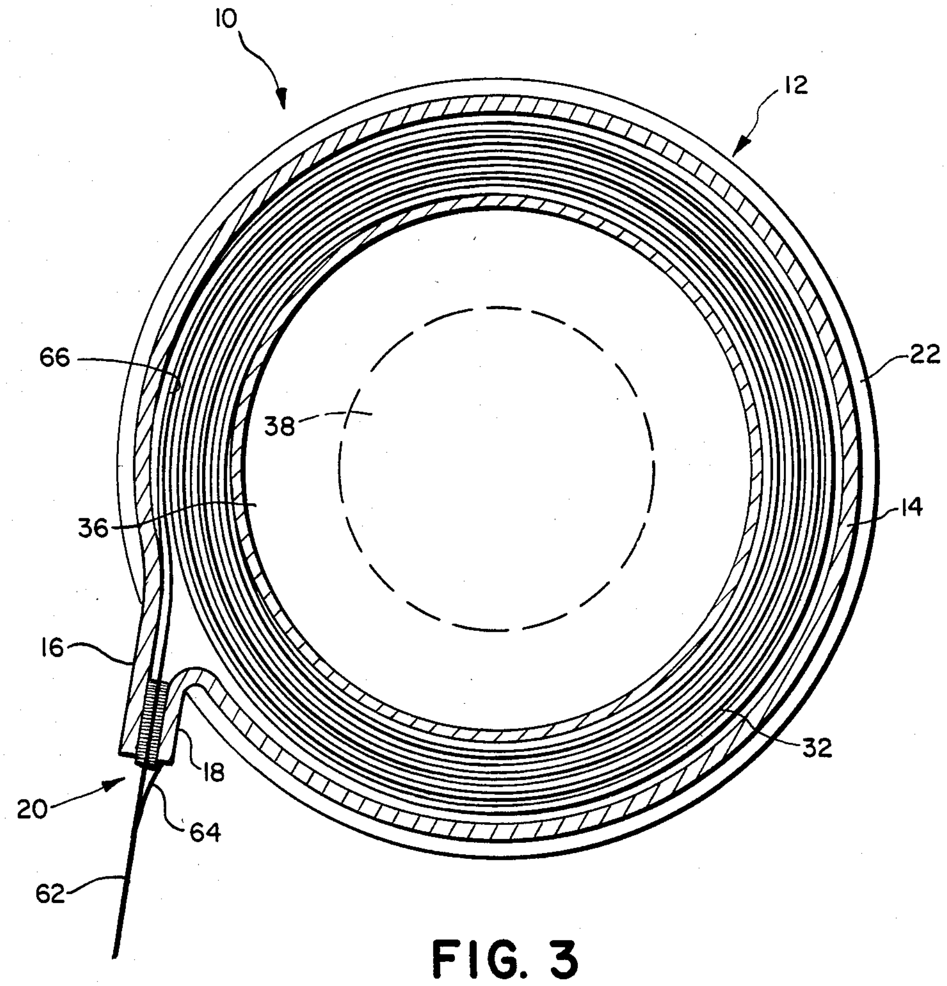
FIG. 3 is a cross sectional end view taken generally along the line 3—3 in FIG. 2.

Reference is now made to the drawings wherein is shown a photographic film assemblage 10 which is comprised of a generally cylindrically configured film cassette 12 having a shell 14 whose opposite free edges 16 and 18 define a lighttight film withdrawal slot or opening 20, and a pair of end caps 22 and 24 which are frictionally secured to the opposite ends 26 and 28 of the shell 14.

The film assemblage 10 also includes a film spool or support member 30 and a length of film 32, preferably of the self-developing transparency type. The film spool 30 includes a tube 34, preferably of a cylindrical configuration, and a piston 36 which is mounted in the tube 34 for linear movement. The film spool 30 is centrally located and rotatably supported within the film cassette 12 by a pair of journals 38 and 40 which are integral extensions of the piston 36 and the tube 34, respectively, and which extend through apertures 42 and 44 in the end caps 22 and 24, respectively. As is well known in the art, each of the journals 38 and 40 is provided with one or more integral flanges 46 via which the film spool 30 may be rotatably driven by a member of a camera.

The piston 36 is attached to an inwardly directed wall 48 of the tube 34 by a rail 50 which extends outwardly from the journal 38 and rides in an open-ended groove 52 in the wall 48. Thus connected, rotation of the journal 38 is transferred to the tube 34. However, linear movement of the piston 36, from a first position (shown in FIG. 2) to a second position wherein it is located deeper within the tube 34, is initially prevented by a frangible member 54 which extends outwardly from the rail 50 and rides on top of the wall 48.

The interior of the tube 34 also accommodates a supply of processing fluid 56, preferably in liquid form, which is adapted to be pressurized to a degree sufficient to cause it to be moved into a chamber containing the film 32. More specifically, the exterior surface of the tube 34 cooperates with the interior surfaces of the film cassette 12 to define an annular chamber 58 which is adapted to house the film 32 in a light-free environment. Also the closed end of the tube 34 is provided with one or more rupturable ports 60 which provide for communication between the interior of the tube 34 and the chamber 58. The processing fluid 56 is adapted to be pressurized to a degree sufficient to rupture the port(s) 60 by applying a force to the piston 36 along the longitudinal axis of the film spool 30.

The film 32 is coiled about the film spool 30 with one of its ends secured to the tube 34 and its opposite end or leader 62 extending through the lighttight opening 20 for subsequent attachment to a film take-up member of a camera. The leader 62 is provided with a partially cut out section 64 which is formed such that its free end is located out of the plane of the film from which it was cut. Thus, as best seen in FIG. 3, it functions as a stop to prevent the leader 62 from being fully moved into the film cassette 12 during rewinding of the film.

In the use of the invention, the film assemblage 10 is loaded into a camera, the film 32 progressively withdrawn from the film cassette 12 and photographically exposed frame-by-frame, and finally rewound into the film cassette 12, all as is well known in the art. The film assemblage 10 is then removed from the camera and a force is manually applied to the journal 38 of the film spool 30 until the member 54 is broken thus allowing the force being applied to the piston 36 to be applied to the processing fluid 56. This force may be applied to the journal 38 by any suitable member such as a finger and/or a slender member such as a pencil. Such force also increases the pressure of the processing liquid 56 to a level at which the ports 60 are ruptured and the fluid 56 expressed into the chamber 58 as the piston 36 moves toward the second position. As the processing fluid 56 enters the chamber 58 it engages the major surfaces of the convolutions of the exposed film 32 so as to initiate the formation of visible images within the film 32. Maximum contact between the surfaces of the film 32 and the processing fluid 56 is obtained by providing each of the inwardly facing surfaces of the end caps 22 and 24 with a spiral groove 66 and 68, respectively, in which the opposite edges of the film 32 are located so as to space adjacent convolutions of the film 32 from each other, as best seen in FIG. 2. Also, the processing fluid 56 is confined to the interior of the film cassette 12 via any suitable means, e.g., O-rings 70 and 72 located in adjacent annular recesses in the end caps 22 and 24 and the film spool 30, and an O-ring 74 located in an annular recess in the piston 36. After a predetermined period of time to allow the initiation of visible images within the film, e.g. one minute, the operator may grasp the leader 62 and withdraw the processed film from within the film casette 12.

Since certain changes may be made in the above film assemblage without departing from the scope of the invention herein involved, it is intended that all matter contained in the above description or shown in the accompanying drawings shall be interpreted as illustrative and not in a limiting sense.

What is claimed is:

1. A photographic film assemblage for use with commercially available, compact, still picture cameras of the type having means for operably locating a film cassette containing a single roll of film in a position in which the film is adapted to be progressively withdrawn from the film cassette and exposed prior to being rewound into the film cassette, said film assemblage comprising:

a film cassette for housing a roll of self-developing type film, said film cassette including means defining a lighttight opening through which the film is adapted to be moved to the exterior of said film cassette for exposure thereof;

a length of self-developing type film coiled within said film cassette, said film including a first end which is adapted to be attached to a support member located within said film cassette and a second opposite end which is adapted to extend through said opening in said film cassette for subsequent attachment to a film take-up member of a camera;

a support member including a tube and a piston rotatably supported as a unit within said film cassette, said tube cooperating with an interior surface of said film cassette to define a chamber, said tube having at least one rupturable port leading from the interior of said tube to said chamber, said piston being mounted within said tube for movement between a first position in which a portion of said piston extends exteriorly of said tube and a second position in which said piston is located deeper within said tube; and a supply of processing fluid located within said tube, said processing fluid being pressurizable, by said piston to a degree sufficient to rupture said at least one port to thereby permit the flow of said fluid into said chamber where it will initiate the formation of visible images in any photographically exposed film contained therein as said piston moves toward said second position.

2. A photographic film assemblage as defined in claim 1 further comprising means for spacing adjacent convolutions of said film from each other thereby faciltating contact between the film's surfaces and said processing fluid.

3. A photographic film assemblage as defined in claim 2 wherein said film cassette includes a pair of end caps each of which contains an inwardly facing surface, and said spacing means includes a spiral groove formed in each of said facing surfaces.

4. A photographic film assemblage as defined in claim 1 wherein said piston is adapted to be manually moved toward said second position.

5. A photographic film assemblage as defined in claim 4 wherein said piston includes means cooperable with said tube for preventing movement of said piston toward said second position until a predetermined force has been applied to said piston.

* * * * *